G. Natcher.
Millstone Dress.
Nº 20,083. Patented Apr. 27, 1858.
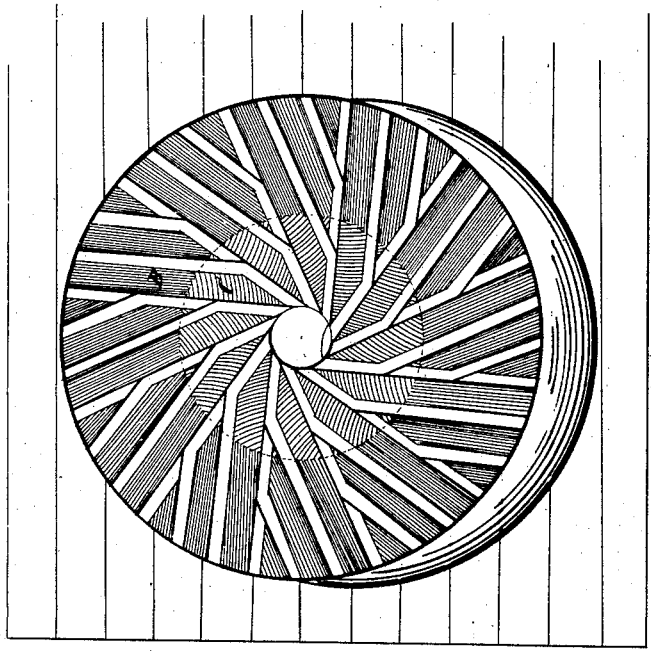
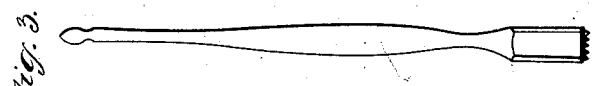
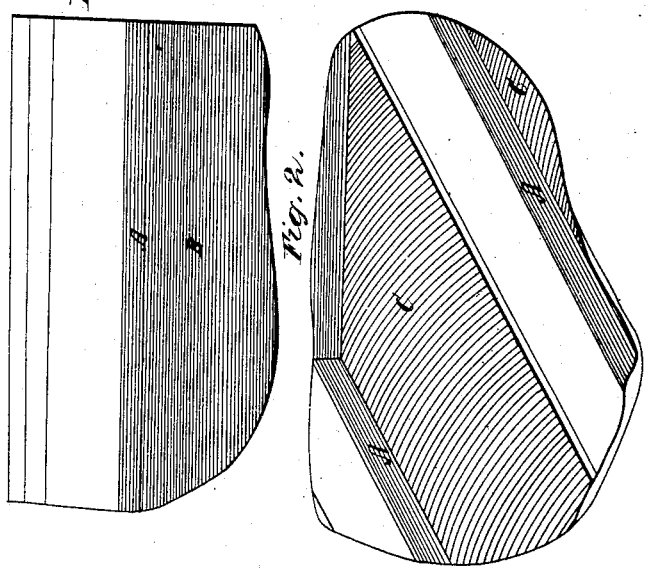

UNITED STATES PATENT OFFICE.

G. NATCHER, OF INDIANAPOLIS, INDIANA.

MILLSTONE-DRESS.

Specification of Letters Patent No. 20,083, dated April 27, 1858.

*To all whom it may concern:*

Be it known that I, GABRIEL NATCHER, of Indianapolis, in the county of Marion and State of Indiana, have invented a new and Improved Mode of Dressing Millstones; and I do hereby declare that the following is a full and exact description thereof, reference being had to the accompanying drawings and the letters of reference marked thereon.

Figures 1 and 2 are sections of the stone showing the dress. Fig. 3, is a view of the plane or instrument with which the dress is put upon the grinding surface of the stone. Fig. 4 is a view of the stone completely dressed for work.

The following is the manner of preparing and dressing the stone. The general plan of laying out the face of the stone is the same used in other modes of dressing. The deep furrows may remain unchanged when my dress is put upon a stone, as will be shown.

In my improvement the first operation is to cleanse the stone by applying the following solution, to wit,—one gallon of vinegar, a quarter of a pound of saltpeter, a quarter of a pound of tartaric acid, and a half a pound of common salt well mixed. I then take pipe-clay and emery and polish the stone, planing out the furrows as true as possible. Two thirds of the way up the inclined plane of the furrow, at A, the crack or grinding surface is commenced.

The whole of the face being polished as smooth as possible, then the tool, which I am about to describe is used. The tool is composed of one or more diamonds inserted in a bitt or handle, and when two or more diamonds are used they are to be firmly set in a row at equal distances apart. The furrows or cracks A and B, are produced by running the points or diamonds over the face of the stone, by the side of a straight ruler. The curved lines, as represented at C, C, C, are made by operating the same diamond-points by the side of a curved ruler. The width of the space separating the lines upon the grinding surface of the stone is regulated by holding the points more or less diagonally across the line of motion.

In order to show the precise nature and value of my invention it is necessary to compare it with the ordinary modes of dressing mill-stones. In the usual mode, the pick being brought down upon the face of the stone produces the stellated fracture, thereby weakening or disintegrating the stone as far as the fracture extends. Thus the edges of the crack weakened by the blow from the pick soon crumble away wearing the face of the stone as the particles thus detached are thrown out. All these disadvantages are entirely prevented by my mode of dress.

The line cut by the diamond upon a glossy surface which has never been detonated or disintegrated by a blow from a pick, is clear and distinct, having its edges sharp and fine, with no disposition to crumble, the cohesion being perfect up to the edge of the crack, thereby insuring a sharp corner or cutting edge perfectly straight and equal. It is also demonstrated by experience that stones dressed after my mode will and have run six times as long, and perform more than six times the amount of work. The stone will be more perfect when dressed again upon my plan, as I get below the bruises occasioned by the old mode of dressing with a pick.

Another advantage is shown, by tracing the operation of grinding, and exhibiting the destruction between stones dressed by the old methods, and my own. In the old mode of dressing with a pick, the furrow is rougher and nearly flat at the bottom. My furrow is smooth, having the side upon which the grain rises a regular, smooth inclined plane. The passage of the grain to the face is uniformly checked by the lines at A where the bran is taken off. As there is no crushing contact of the stone with the wheat. The sharp edges of the bracks, or small lines cutting or shaving up the grain, while no roughness or inequality is allowed although brought very close together the stones running clear of each other produce a clear whistling sound, differing from that attained by any other mode of dress which I attribute to the uniformity of the face of the stone.

The flour comes from the stone with all its nutrition, as the stones run very close, scraping the bran clean without cutting it up. There is no perceptible moisture generated in the operation of grinding, by this mode, and the spouts are clean and dry, which I attribute to the fact that the grain is kept back or in toward the eye, by the retarding curved lines, until well ground, and while the motion is less rapid and consequently less liable to heat the pressure being the same when having reached the extreme of the breast circle it is rapidly thrown from the stone, finding few or no inequalities to retard its egress.

Numerous experiments have also demonstrated that much less power, is necessary, when my mode of dress is employed, to produce the same amount of a superior article of flour.

What I claim and desire to secure by Letters Patent is—

1. The lines A upon the upper portion of the inclined plane of the furrow.

2. The curved or retarding lines C upon the breast circle.

3. The parallel or uniform lines upon the whole surface running straight or at any desired curve.

4. The combination and arrangement of the various parts above described, making up the complete dress of the millstone when arranged and operated substantially as set forth.

GABRIEL NATCHER.

In presence of—
H. W. ELLSWORTH,
JOHN H. REDSTONE.